(12) United States Patent
Panditharadhya et al.

(10) Patent No.: US 8,018,471 B2
(45) Date of Patent: Sep. 13, 2011

(54) VISUAL COMPONENT/CLAUSE MERGING

(75) Inventors: Nagalinga Durga Prasad Sripathi Panditharadhya, Redmond, WA (US); John Edward Churchill, Monroe, WA (US); Udaya Kumar Bhaskara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 11/433,963

(22) Filed: May 15, 2006

(65) Prior Publication Data

US 2007/0263012 A1 Nov. 15, 2007

(51) Int. Cl.
*G09G 5/00* (2006.01)

(52) U.S. Cl. ........ 345/629; 345/418; 345/630; 345/631; 345/632

(58) Field of Classification Search .................. 345/418, 345/619, 629, 630, 631, 632, 636, 642, 643; 707/1–5, 10; 715/234; 719/345, 316, 330
See application file for complete search history.

(56) References Cited

U.S. PATENT DOCUMENTS

| | | | |
|---|---|---|---|
| 5,418,950 A * | 5/1995 | Li et al. ................................. | 1/1 |
| 5,495,605 A * | 2/1996 | Cadot .................................. | 707/4 |
| 5,504,690 A | 4/1996 | Kageyama et al. | |
| 5,642,304 A | 6/1997 | Simpson | |
| 5,721,900 A * | 2/1998 | Banning et al. ...................... | 707/4 |
| 5,742,806 A * | 4/1998 | Reiner et al. ........................... | 1/1 |
| 5,822,750 A * | 10/1998 | Jou et al. .................................. | 1/1 |
| 5,886,698 A * | 3/1999 | Sciammarella et al. ....... | 715/769 |
| 6,021,405 A * | 2/2000 | Celis et al. ................................ | 1/1 |
| 6,049,332 A * | 4/2000 | Boetje et al. ................. | 715/721 |
| 6,111,574 A * | 8/2000 | Meek ............................... | 715/835 |
| 6,147,685 A * | 11/2000 | Bliss et al. .................... | 715/769 |
| 6,397,370 B1 | 5/2002 | Fernandez et al. | |
| 6,434,545 B1 * | 8/2002 | MacLeod et al. ................. | 707/3 |
| 6,470,335 B1 * | 10/2002 | Marusak .......................... | 707/4 |
| 6,473,884 B1 | 10/2002 | Ganai et al. | |

(Continued)

FOREIGN PATENT DOCUMENTS

EP 1484691 A1 8/2004

OTHER PUBLICATIONS

Blaauw, et al., "Optimization of Relational Expressions Using a Logical Analogon", Retrieved at <<http://www.research.ibm.com/journal/rd/275/ibmrd2705I.pdf>>, IBM Journal of Research and Development, vol. 27, No. 5, Sep. 1983, pp. 497-519.

(Continued)

*Primary Examiner* — Andrew Wang
*Assistant Examiner* — Abderrahim Merouan

(57) ABSTRACT

Various technologies and techniques are disclosed that merge components on a design surface. The system receives input from a user to add components or clauses to a design surface and analyzes the components to determine if some of the components can be merged. If the system identifies components that can be merged, then the system merges the identified components to reduce the number of components present on the design surface. The system determines that some components can be merged if the components meet the same criteria, such as having components that are equivalent and that have the same number of incoming paths or the same number of outgoing paths. The system provides a visual indicator on the design surface to indicate that components are being merged. The system provides an undo feature to allow the user to undo the component merging when desired.

9 Claims, 19 Drawing Sheets

U.S. PATENT DOCUMENTS

| | | | | |
|---|---|---|---|---|
| 6,640,221 B1 * | 10/2003 | Levine et al. | | 1/1 |
| 6,785,668 B1 * | 8/2004 | Polo et al. | | 707/2 |
| 6,826,566 B2 * | 11/2004 | Lewak et al. | | 707/4 |
| 7,904,487 B2 * | 3/2011 | Ghatare | | 707/803 |
| 2003/0023942 A1 | 1/2003 | Kurupati | | |
| 2004/0111302 A1 | 6/2004 | Falk et al. | | |
| 2005/0102044 A1 | 5/2005 | Kohn et al. | | |
| 2006/0059461 A1 * | 3/2006 | Baker et al. | | 717/113 |
| 2006/0122990 A1 * | 6/2006 | Smith et al. | | 707/3 |
| 2006/0224982 A1 * | 10/2006 | Albrecht et al. | | 715/764 |

OTHER PUBLICATIONS

Linehan, Mark, "Integrating rules with SOA", Retrieved at <<http://www-128.ibm.com/developerworks/webservices/library/ws-soa-progmodel9/>>, Nov. 29, 2005, pp. 1-8.

Rayside, et al., "Visualizing Flow Diagrams in WebSphere Studio Using SHriMP Views", Retrieved at <<http://www.swen.uwaterloo.ca/~drayside/PAPERS/rayside_isf02.pdf>>, Information Systems Frontiers, vol. 5, No. 2, 2003, pp. 1-27.

* cited by examiner

VISUAL COMPONENT/CLAUSE MERGING

BACKGROUND

There are numerous types of visual designers on the market today that allow users to create sophisticated diagrams, business process integrations, user interfaces, and so on. These visual designers allow users to drag and drop components, such as clauses and/or shapes, onto a design surface, and to manually arrange the components as desired. Some visual designers allow a user to select a particular set of components and specify certain commands to apply to those components, such as to align them with the same left side, or to apply the same font size to them.

The user may frequently use the same component multiple times on the same drawing. In order to reduce clutter on the design surface and/or to eliminate redundant components, the user must manually analyze the components that are present and decide which ones are redundant and can be merged together. Once such a determination is made, the user then must manually move each element that feeds into and out of the given component. This manual process of merging redundant components is very time consuming for the user.

SUMMARY

Various technologies and techniques are disclosed that merge components on a design surface. The system receives input from a user to add components to a design surface and analyzes the components to determine if at least one set of the components can be merged. If the system identifies some components that can be merged, then the system merges the identified components to reduce the number of components present on the design surface. The system determines that some components can be merged if the components meet the same criteria. Some non-limiting examples of meeting the same criteria can include having components that are equivalent, and components that have the same number of incoming paths or the same number of outgoing paths. The system provides a visual indicator on the design surface to indicate that components are being merged. The system also provides an undo feature to allow the user to undo the component merging when desired.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
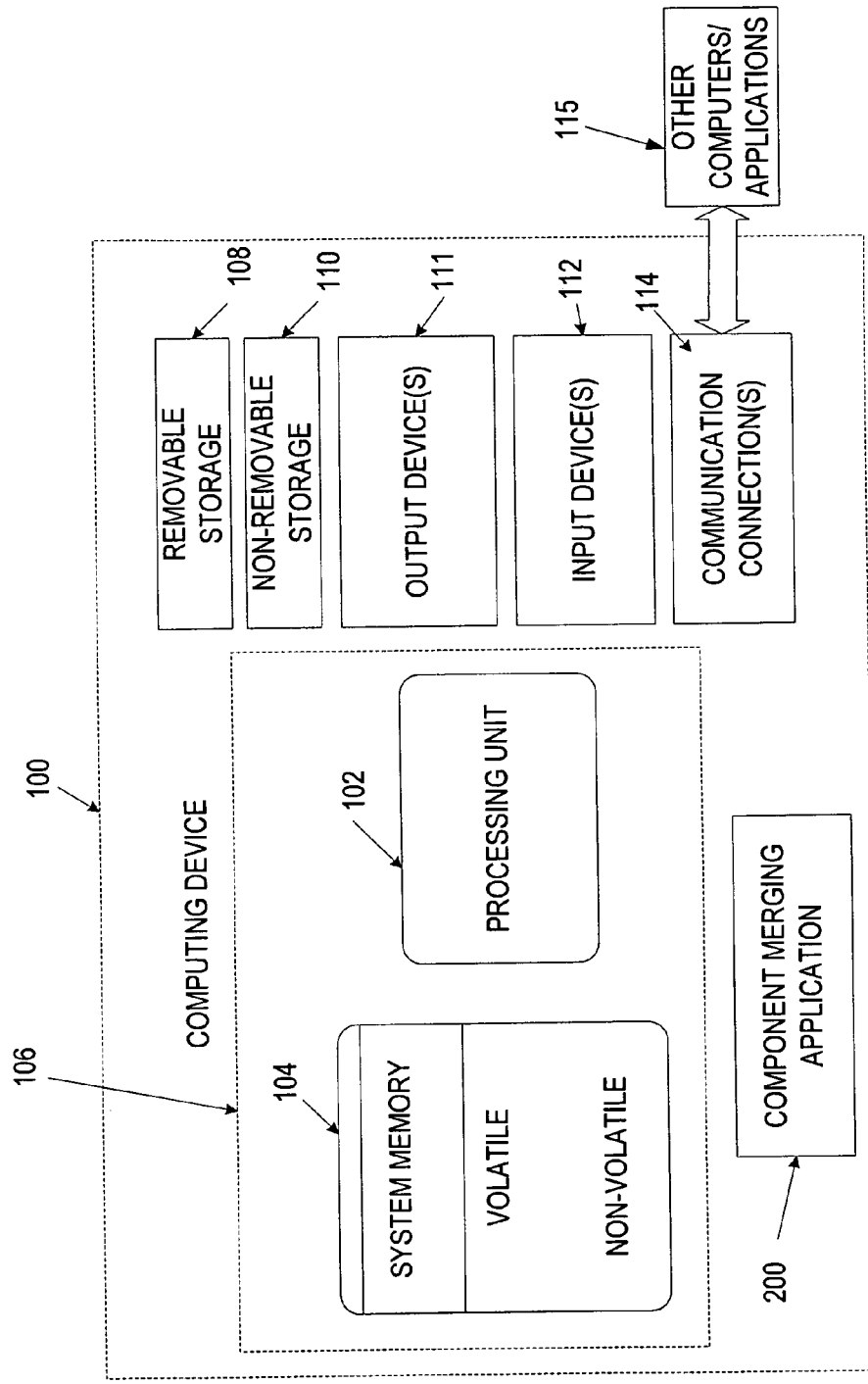
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that merges components/clauses on a design surface, but the system also serves other purposes in addition to these. In one implementation, one or more of the techniques described herein can be implemented as features within a process integration program such as MICROSOFT® BizTalk, MICROSOFT® Office VISIO®, or from any other type of program or service that works with business processes, diagrams, or other visual designs. In another implementation, one or more of the techniques described herein are implemented as features with other applications that deal with components, clauses, and/or shapes drawn on a design surface.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes component merging application 200. Component merging application 200 will be described in further detail in FIG. 2.

Figure 2:
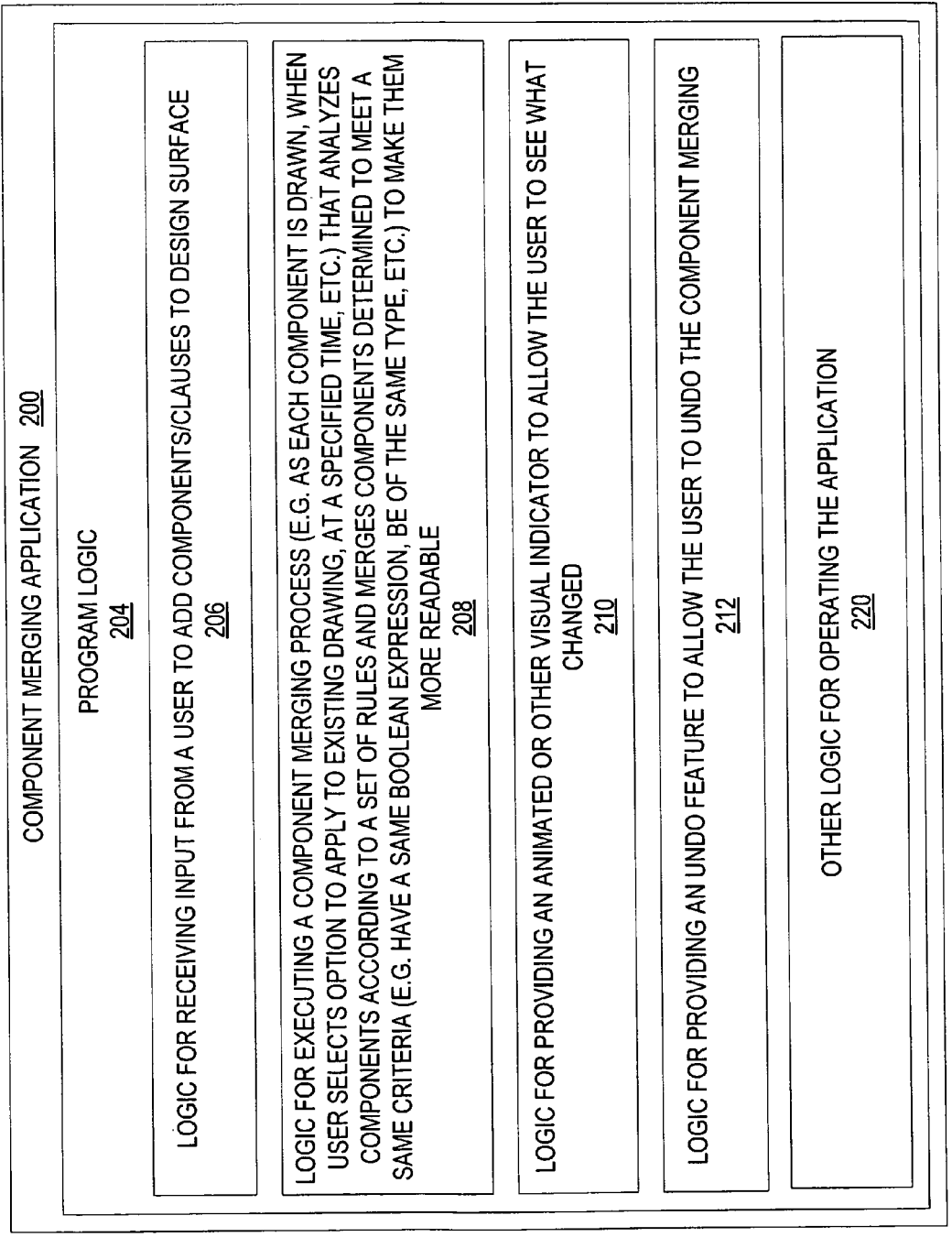
FIG. 2 is a diagrammatic view of a component merging application of one implementation operating on the computer system of FIG. 1.

Turning now to FIG. 2 with continued reference to FIG. 1, a component merging application 200 operating on computing device 100 is illustrated. Component merging application 200 is one of the application programs that reside on computing device 100. However, it will be understood that component merging application 200 can alternatively or additionally be embodied as computer-executable instructions on one or more computers and/or in different variations than shown on FIG. 1. Alternatively or additionally, one or more parts of component merging application 200 can be part of system memory 104, on other computers/applications 115, or other such variations as would occur to one in the computer software art.

Component merging application 200 includes program logic 204, which is responsible for carrying out some or all of the techniques described herein. Program logic 204 includes logic for receiving input from a user to add components/clauses to a design surface 206; logic for executing a component merging process (e.g. as each component is drawn, when user selects option to apply to existing drawing, at a specified time, etc.) that analyzes components according to a set of rules and merges components determined to meet a same criteria (e.g. have a same boolean expression, be of the same type, etc.) to make the design surface more readable 208; logic for providing an animated or other visual indicator to allow the user to see what changed 210; logic for providing an undo feature to allow the user to undo the component merging 212; and other logic for operating application 220. In one implementation, program logic 204 is operable to be called programmatically from another program, such as using a single call to a procedure in program logic 204.

Figure 3:
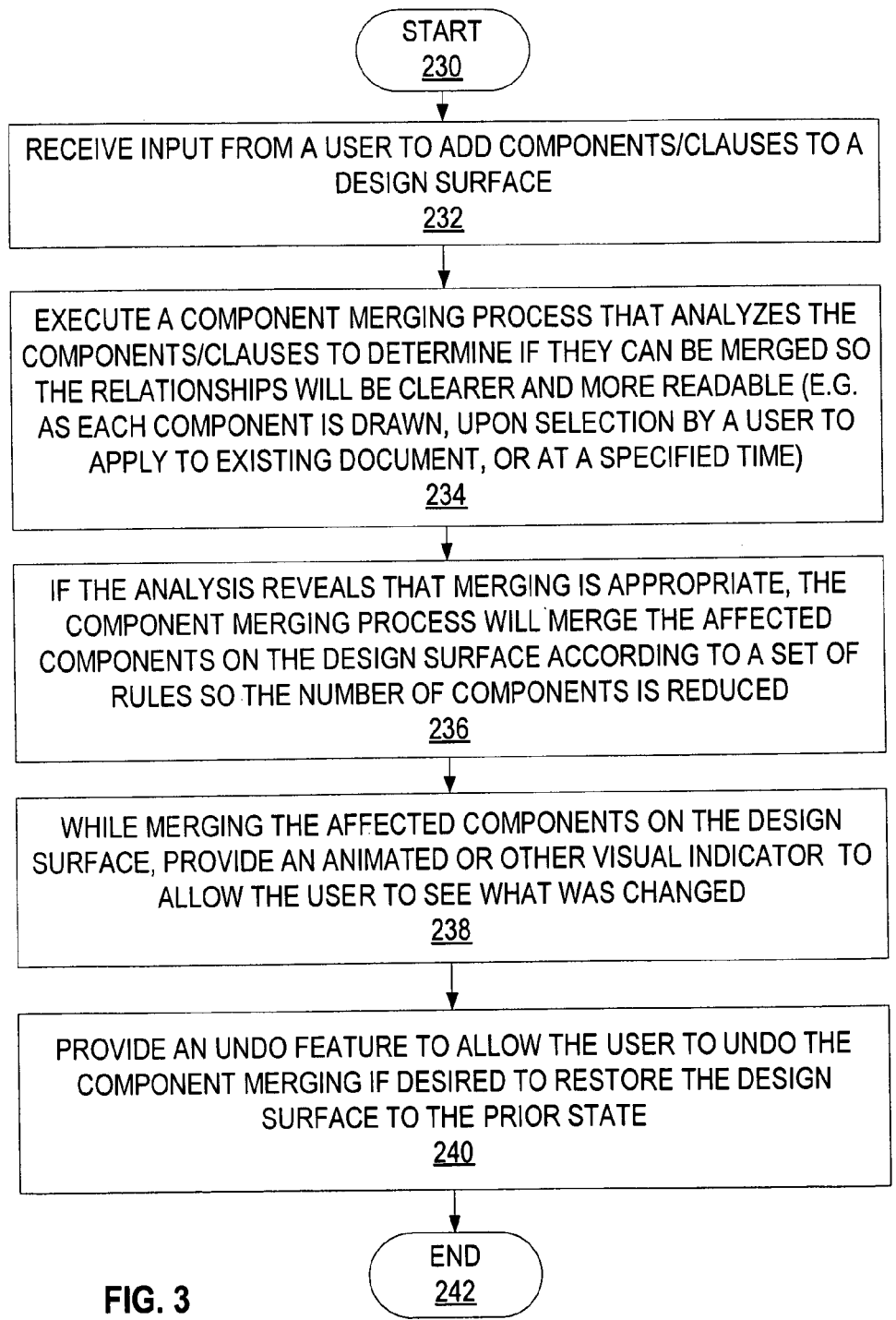
FIG. 3 is a high-level process flow diagram for one implementation of the system of FIG. 1.

Turning now to FIGS. 3-8 with continued reference to FIGS. 1-2, the stages for implementing one or more implementations of component merging application 200 are described in further detail. FIG. 3 is a high level process flow diagram for component merging application 200. In one form, the process of FIG. 3 is at least partially implemented in the operating logic of computing device 100.

The procedure begins at start point 230 with receiving input from a user to add components/clauses to a design surface (stage 232). The system executes a component merging process that analyzes the components/clauses to determine if they can be merged so the relationships will be clearer and/or more readable (stage 234). As a few non-limiting examples, the programmatic clause merging process can be initiated as each component is drawn on the design surface, upon selection by a user to apply the component merging process to an existing document, or at a specified time (stage 234). If the analysis reveals the merging is appropriate, the component merging process will merge the affected components on the design surface according to a set of rules so the number of components is reduced (stage 236). While merging the affected components on the design surface, the system provides an animated or other visual indicator to allow the user to see what changed (stage 238). An undo feature is also provided to allow the user to undo the component merging if desired to restore the design surface to the prior state (stage 240). The process ends at end point 242.

Figure 4:
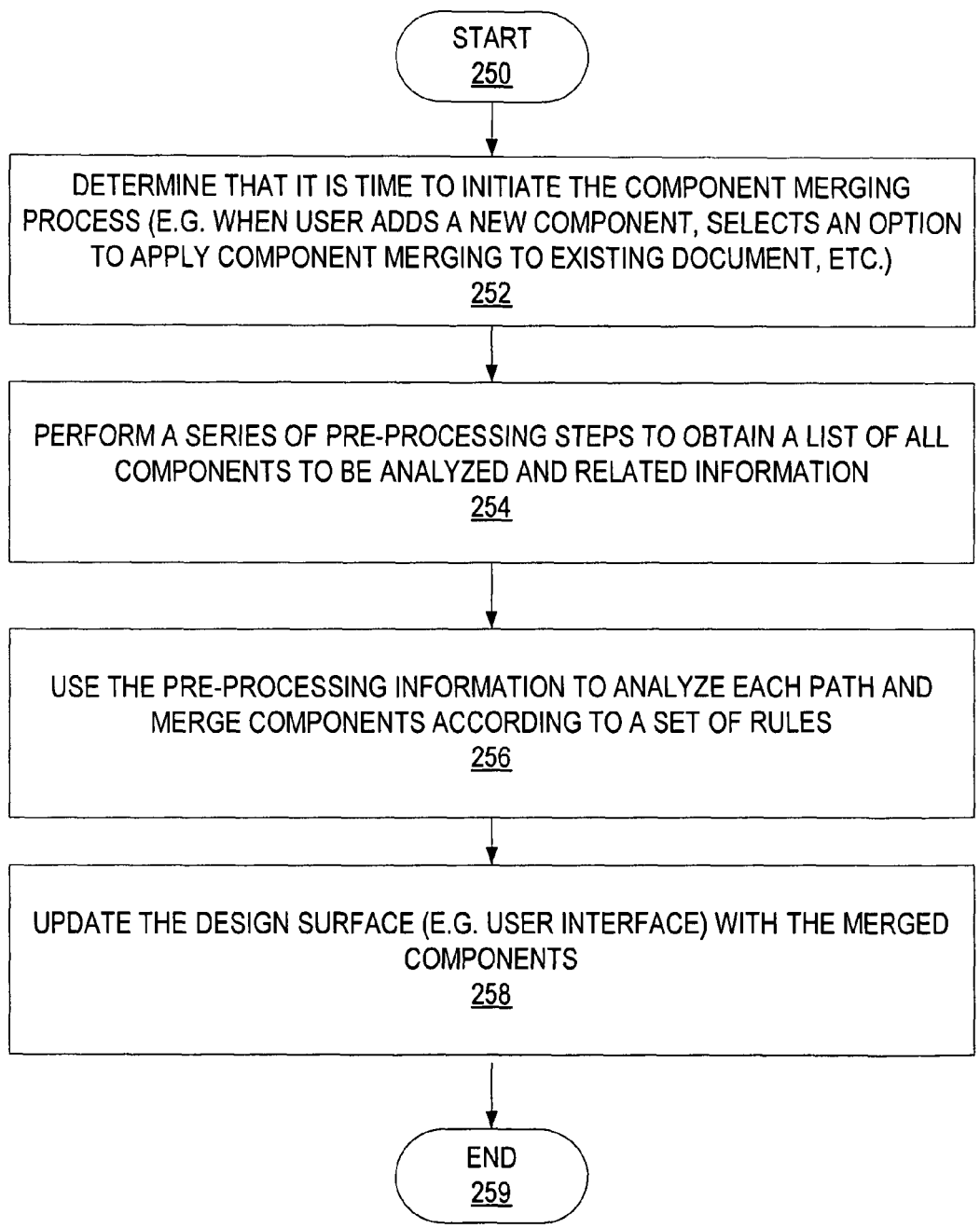
FIG. 4 is a process flow diagram for one implementation of the system of FIG. 1 illustrating the high level stages involved in the component merging process.

FIG. 4 is a process flow diagram that illustrates one implementation of the high level stages involved in the component merging process. In one form, the process of FIG. 4 is at least partially implemented in the operating logic of computing device 100. The procedure begins at start point 250 with determining that it is time to initiate the component merging process, such as when the user adds a new component to the design surface, selects an option to apply component merging to existing document, etc. (stage 252). The system performs a series of pre-processing steps to obtain a list of all components to be analyzed and related information (stage 254). The system then uses the pre-processing information to analyze each path and merge components according to a set of rules (stage 256). The design surface (e.g. user interface) is then updated with the merged components (stage 258). The process ends at end point 259.

Figure 5:
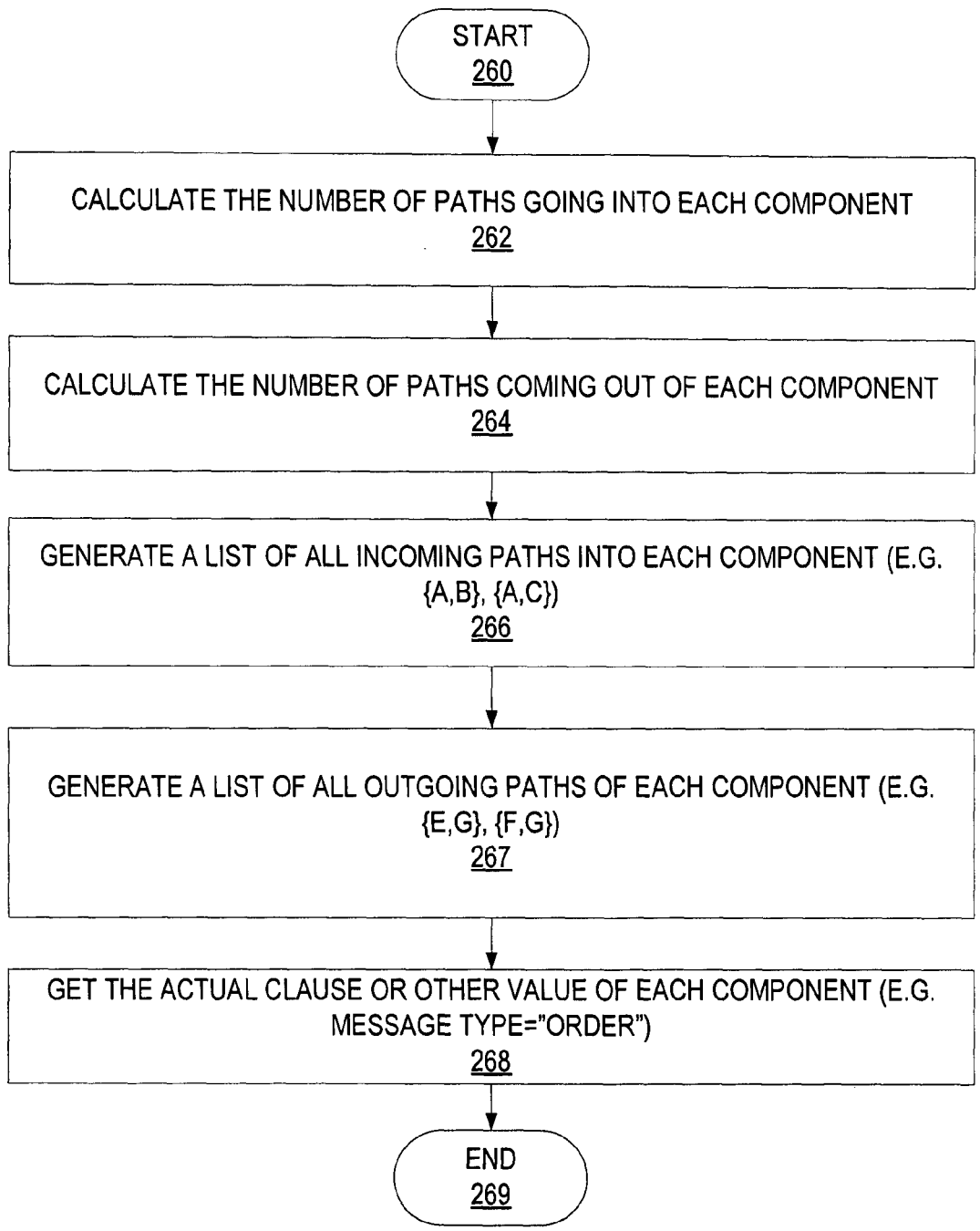
FIG. 5 is a process flow diagram for one implementation of the system of FIG. 1 illustrating the stages involved in performing a pre-processing step as part of the component merging process.

FIG. 5 is a process flow diagram that illustrates one implementation of the stages involved in performing a pre-processing step as part of the component merging process. In one form, the process of FIG. 5 is at least partially implemented in the operating logic of computing device 100. The procedure begins at start point 260 with calculating the numbers of paths going into each component (stage 262). The number of paths coming out of each component is also calculated (stage 264). A list of all incoming paths going into each component is generated (e.g. {A,B}, {A,C}) (stage 266). A list of all outgoing paths coming out of each component is generated (e.g. {E,G}, {F,G} (stage 267). The actual clause or other value of each component is obtained (e.g. message type="order") (stage 268). The process ends at end point 269.

Figure 6:
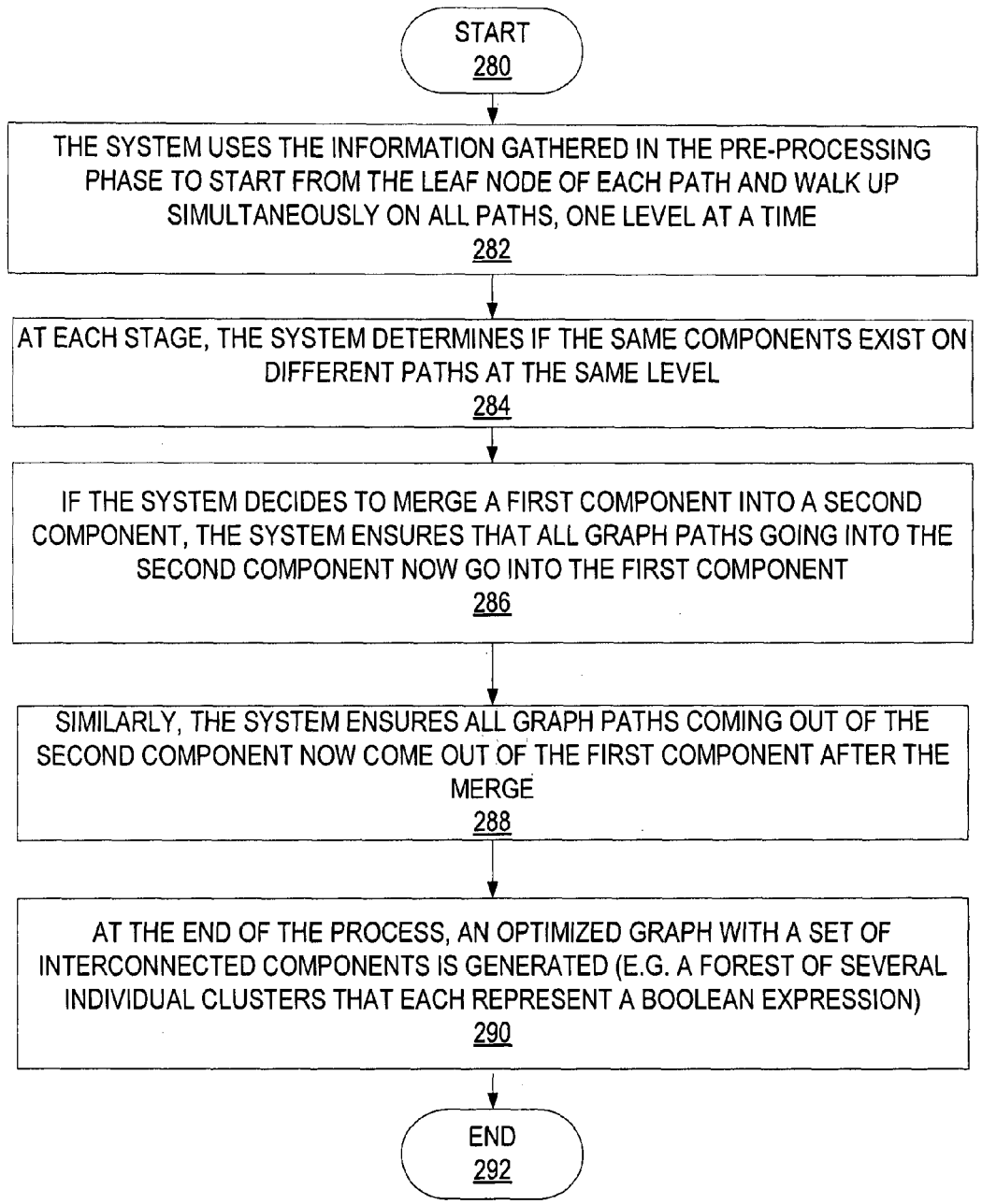
FIG. 6 is a process flow diagram for one implementation of the system of FIG. 1 illustrating the stages involved in the component merging process.

FIG. 6 illustrates a process flow diagram for component merging in one implementation in more detail. In one form, the process of FIG. 6 is at least partially implemented in the operating logic of computing device 100. The procedure begins at start point 280 with the system using the information gathered in the pre-processing phase to start from the leaf node of each path and walk up simultaneously on all paths, one level at a time (stage 282). At each stage, the system determines if the same components exist on different paths at the same level (stage 284). If the system decides to merge a first component into a second component, the system ensures that all graph paths going into the second component now go into the first component (stage 286). Similarly, the system ensures all graph paths coming out of the second component now come out of the first component after the merge (stage 288). At the end of the process, an optimized graph with a set of interconnected components is generated (e.g. a forest of several individual clusters that each represents a Boolean expression) (stage 290). The process ends at end point 292.

Figure 7A:
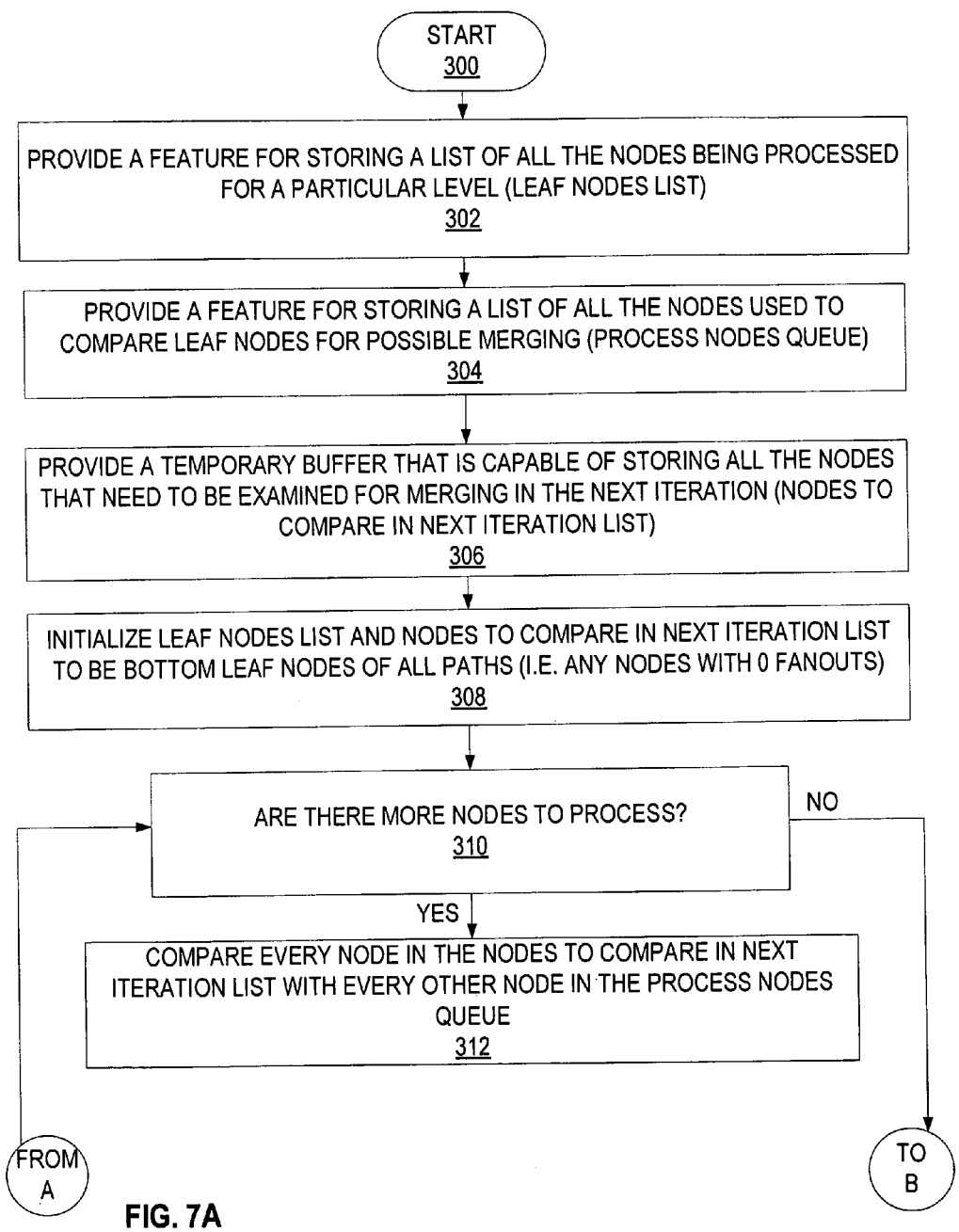
FIG. 7A is a first part of a process flow diagram for one implementation of the system of FIG. 1 that illustrates looping through the components and determining which ones to merge.
Figure 7B:
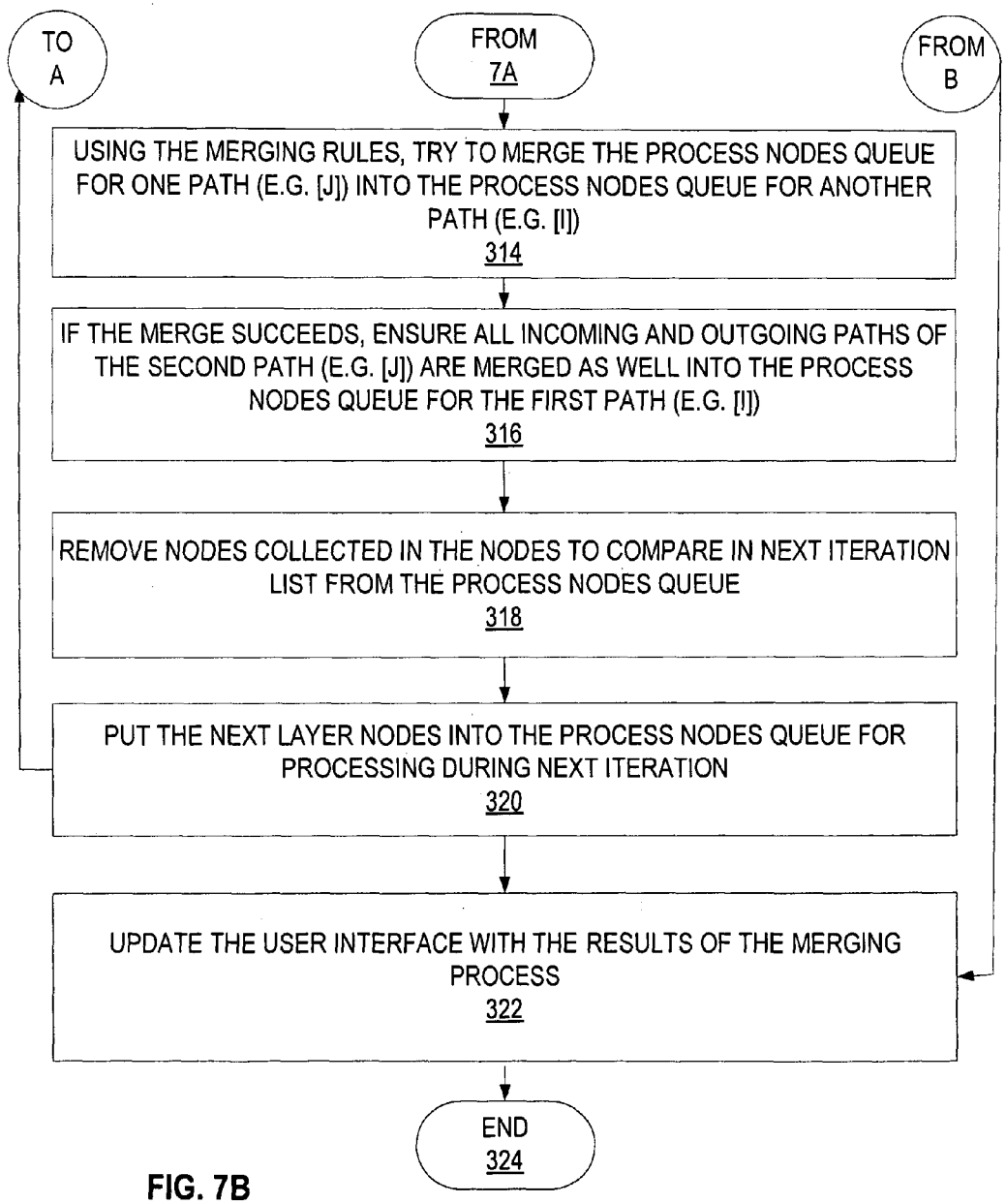
FIG. 7B is a second part of a process flow diagram for one implementation of the system of FIG. 1 that illustrates looping through the components and determining which ones to merge.

FIGS. 7A-7B are process flow diagrams for one implementation that illustrate looping through the components and determining which ones to merge. It will be appreciated that numerous other stages could be used instead of or in addition to the process described in FIGS. 7A-7B. In one form, the process of FIGS. 7A-7B is at least partially implemented in the operating logic of computing device 100. The procedure begins at start point 300 with providing a feature for storing a list of all the nodes being processed for a particular level (e.g. the leaf nodes list) (stage 302). A feature for storing a list of all the nodes used to compare leaf nodes for possible merging is also provided (e.g. the process nodes queue) (stage 304). A temporary buffer that is capable of storing all the nodes that need to be examined for merging in the next iteration is provided (nodes to compare in the next iteration list) (stage 306). The system initializes the leaf nodes list and the nodes to compare in next iteration list to be the bottom leaf nodes of all paths (i.e. any nodes with 0 fanouts) (stage 308). If there are more nodes to process (decision point 310), then the system compares every node in the nodes to compare in next iteration list with every other node in the process nodes queue (stage 312). Using the merging rules, the system tries to merge the process nodes queue for one path (e.g. [j]) into the process nodes queue for another path (e.g. [i]) (stage 316). The system removes nodes collected in the nodes to compare in next iteration list from the process nodes queue (stage 318). The next layer of nodes is put into the process nodes queue for processing during the next iteration (stage 320). The user interface is then updated with the results of the merging process (stage 322). The process ends at end point 324.

Figure 8:
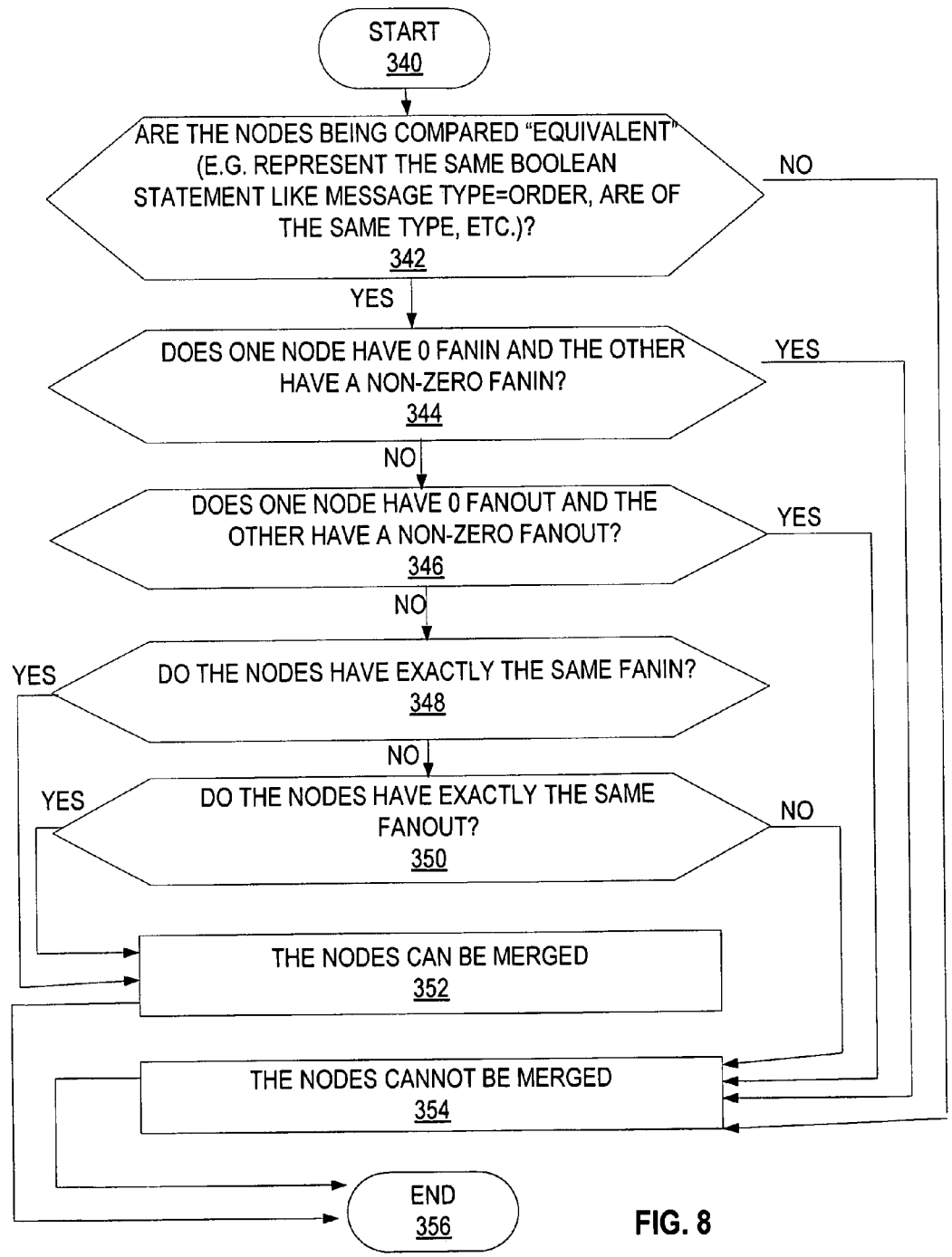
FIG. 8 is a process flow diagram for one implementation of the system of FIG. 1 illustrating a decision process used to determine whether to merge particular components together.

FIG. 8 is a process flow diagram for one implementation that illustrates a decision process used to determine whether to merge particular components together (e.g. when they meet the same criteria). In one form, the process of FIG. 8 is at least partially implemented in the operating logic of computing device 100. The process described in FIG. 8 is only one example of the types of criteria that can be used to determine whether to merge particular components together. Numerous other criteria could also be used instead of or in addition to these described in FIG. 8. The procedure begins at start point 340 with determining whether the nodes (e.g. components) being compared are "equivalent" (decision point 342). Non-limiting examples of the nodes being equivalent include whether the nodes represent the same Boolean statement like "message type=order", whether the nodes are of the same type, etc. If the nodes are not determined to be equivalent, then the nodes cannot be merged (stage 354), and the process ends at end point 356.

If the nodes are determined to be equivalent, then the system proceeds to see if additional criteria are also met. The system checks to see if one node has a 0 fanin (no incoming paths) and the other node has a non-zero fanin (some incoming paths) (decision point 344). If so, then the nodes cannot be merged (stage 354) and the process ends at end point 356. Otherwise, the system checks to see if one node has 0 fanout (no outgoing paths) and the other node has a non-zero fanout (some outgoing paths) (stage 346). If so, then the nodes cannot be merged (stage 354) and the process ends at end point 356. Otherwise, the system checks to see if the nodes have exactly the same fanin (incoming paths) (decision point 348). If so, then the nodes can be merged (stage 352). If the nodes have exactly the same fanout (outgoing paths) (decision point 350), then they also can be merged (stage 352).

Figure 9:
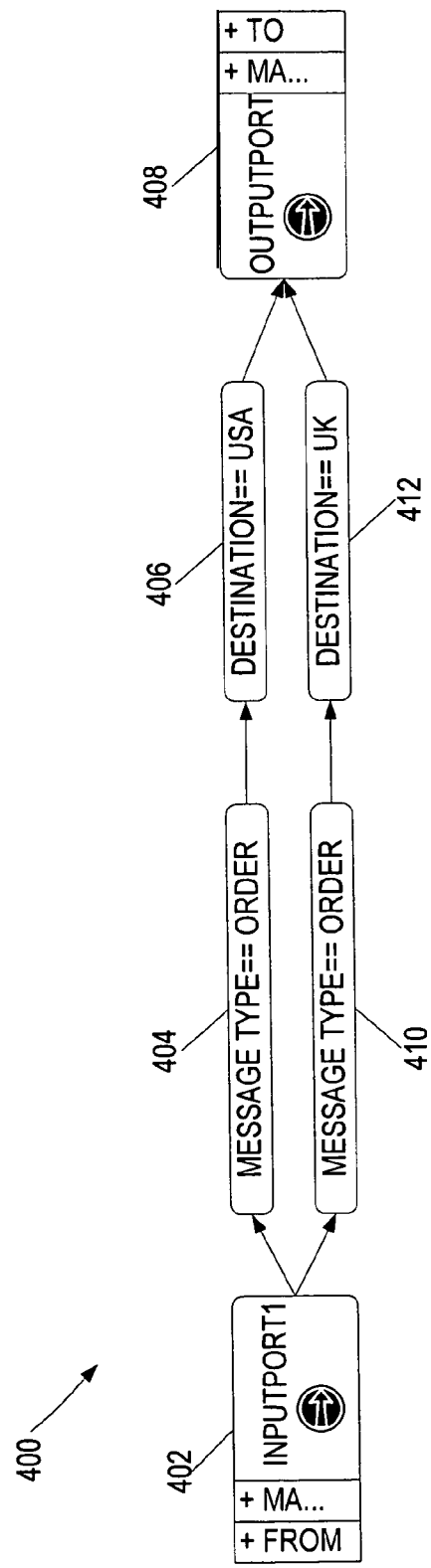
FIG. 9 is a simulated graphical representation for one implementation of the system of FIG. 1 illustrating an exemplary set of components analyzed by the component merging process.
Figure 10:
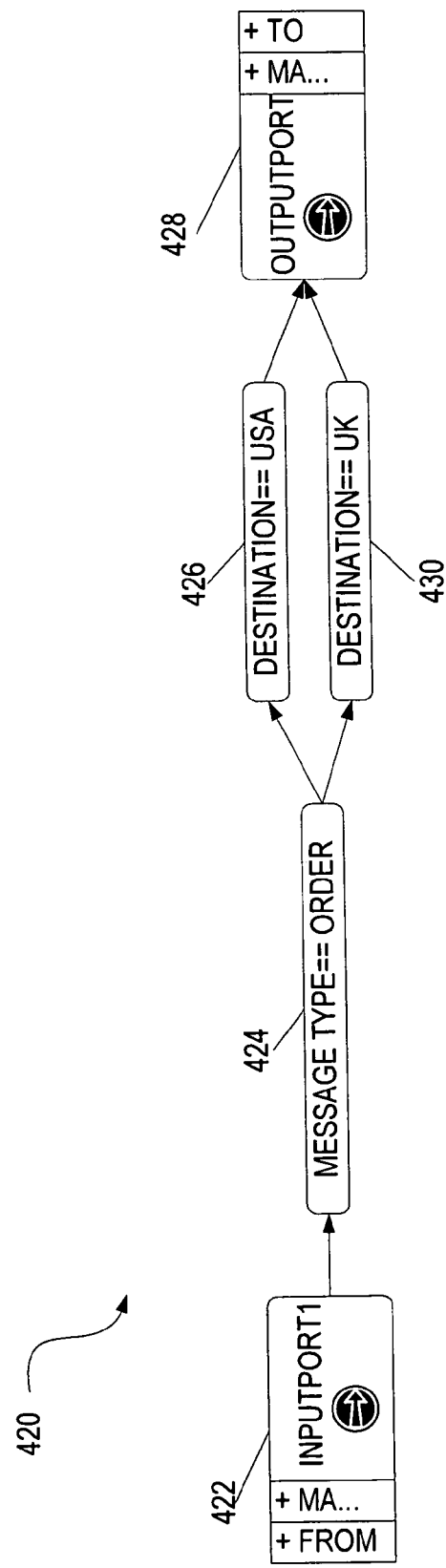
FIG. 10 is a simulated graphical representation for one implementation of the system of FIG. 1 illustrating an exemplary set of components that have been revised from the prior status in FIG. 9 after performing the component merging process.

Turning now to FIGS. 9-18, non-limiting examples will be shown to illustrate the operation of the process flow diagrams of FIGS. 3-8 in further detail. FIG. 9 is a simulated graphical representation 400 for one implementation of the system of FIG. 1 illustrating an exemplary set of components placed on a design surface by a user that are then analyzed by the component merging process. An input port 402 is shown connected to two components 404 and 410. Component 404, with a message type=order is connected to component 406, with a destination=USA. Component 410, also with a message type=order, is connected to component 412, with a destination=UK. Component 406 and component 412 both connect to output port 408. In the simulated graphical representation 400, component 404 and component 410 both have an identical Boolean expression: message type=order. After using one or more of the techniques discussed herein to perform a component merging process, these two clauses 404 and 410 are merged together into one single clause 424, as shown on FIG. 10 with simulated graphical representation 420. The other components (422, 426, 428, and 430) remain the same as before the merge, except now there are two outgoing connections coming from the newly merged component 424. In one implementation, this component merging process reduces a number of components on the design surface. In another implementation, this component merging process makes the design surface more readable to the user.

Figure 11:
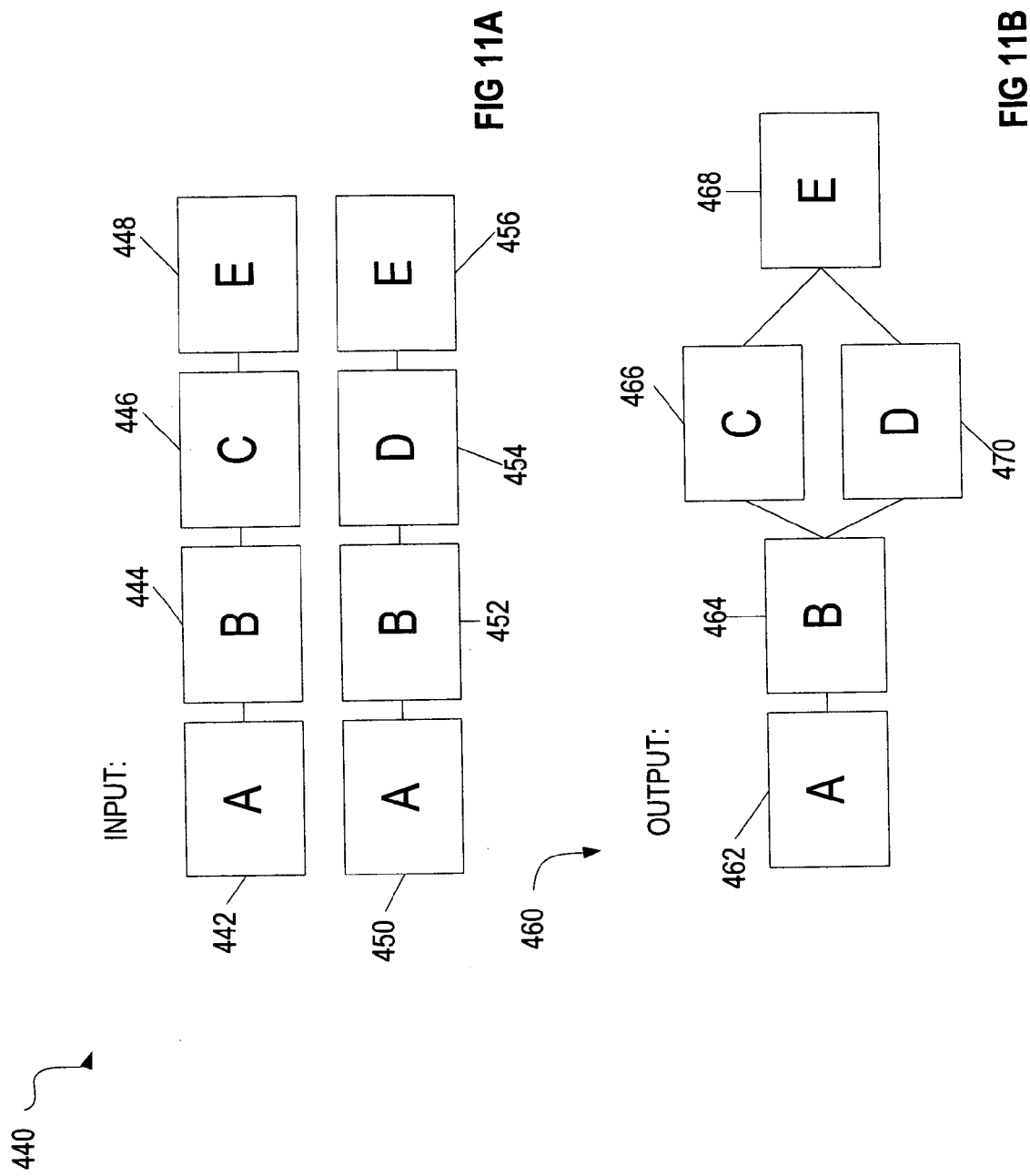
FIG. 11A is a logical diagram for one implementation of the system of FIG. 1 illustrating an exemplary set of components used as input for the component merging process.
FIG. 11B is a logical diagram for one implementation of the system of FIG. 1 illustrating an exemplary set of components that are output after the component merging process analyzed the exemplary components in FIG. 11A.
Figure 12:
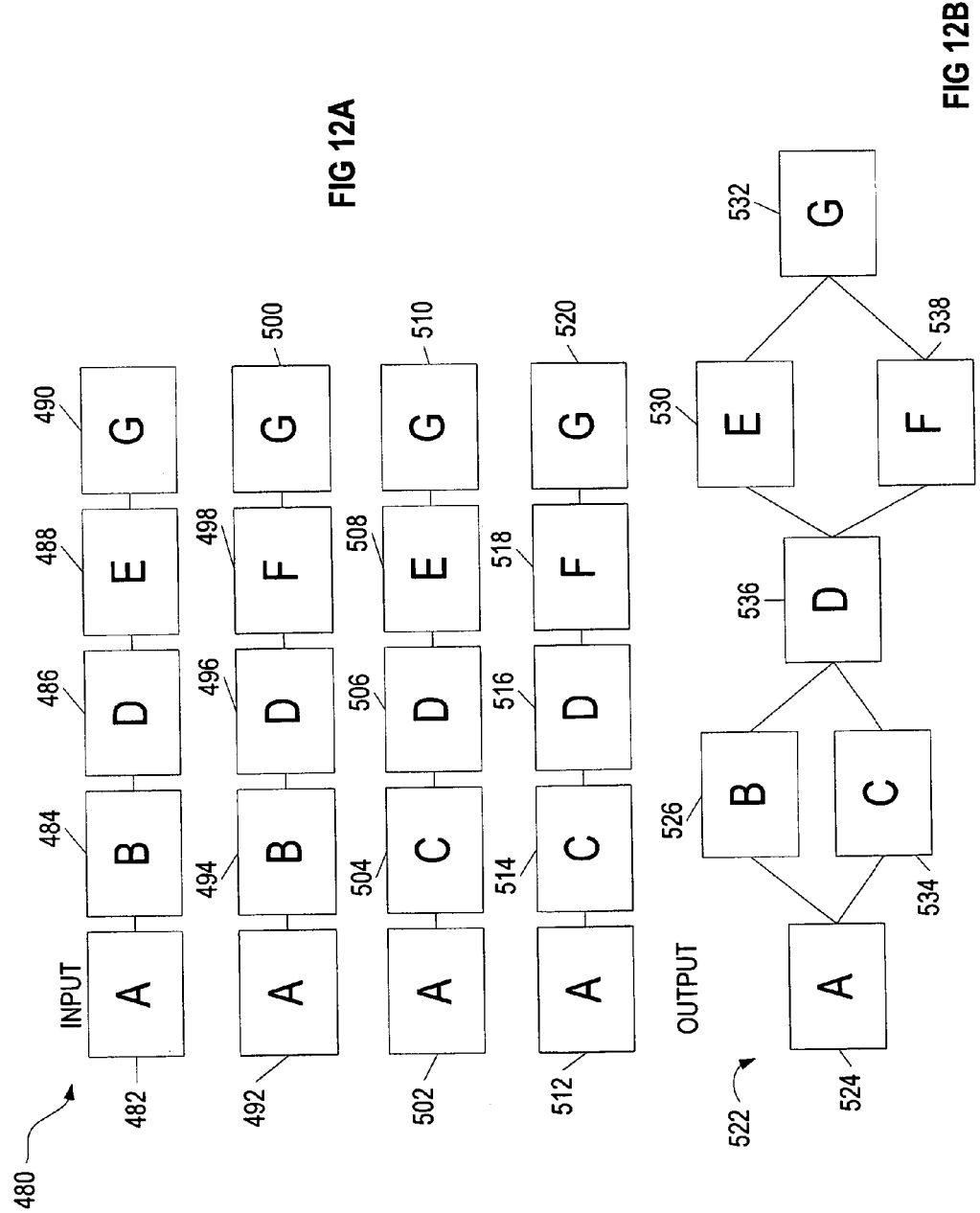
FIG. 12A is a logical diagram for one implementation of the system of FIG. 1 illustrating an exemplary set of components used as input for the component merging process.
FIG. 12B is a logical diagram for one implementation of the system of FIG. 1 illustrating an exemplary set of components that are output after the component merging process analyzed the exemplary components in FIG. 12A.

Turning now to FIG. 11A, a logical diagram for one implementation of the system of FIG. 1 is shown that illustrates an exemplary set of components used as input for the component merging process. For the sake of simplicity, the logical diagrams shown on FIGS. 11-18 use letters of the alphabet to represent the values, actual clauses, or types of components (e.g. whatever values are being used to determine whether the components are "equivalent"). Values 440 on FIG. 11A are inputs to component merging process. There are two distinct paths shown. The first path goes from A (442) to B (444) to C (446) to E (448). The second path goes from A (450) to B (452) to D (454) to E (456).

Turning now to FIG. 11B with continued reference to FIG. 11A, a logical diagram is shown for one implementation that illustrates an exemplary set of components that are output after the component merging process analyzes the exemplary components in FIG. 11A. The two paths described in FIG. 11A are now merged into fewer paths. The two A components (442 and 450) are merged into the new A (462), the two B components (444 and 452) are merged into the new B (464), and the two E components (448 and 456), are merged into the new E (468). The C (446) and D (454) components are now branches (466 and 470, respectively) off of the new B (464).

FIG. 12A includes another exemplary set of components 480 used as input for the component merging process for one implementation. There are four distinct paths shown in FIG. 12A. The first path flows from A (482) to B (484) to D (486) to E (488) to G (490). The second path flows from A (492) to B (494) to D (496) to F (498) to G (500). The third path flows from A (502) to C (504) to D (506) to E (508) to G (510). The final path flows from A (512) to C (514) to D (516) to F (518) to G (520).

Turning now to FIG. 12B, with continued reference to FIG. 12A, an exemplary set of components 522 is shown that are output after the component merging process analyzes the components shown in FIG. 12A. The four paths from FIG. 12A have now been merged into fewer paths. Each A (482, 492, 502, and 512) has been merged into a new A (524). Each B (484 and 494) has been merged into the new B (526). Each C (504 and 514) has been merged into a new C (534). Each D (486, 496, 506, and 516) has been merged into a new D (536). Each E (488 and 508) has been merged into a new E (530). Each F (498 and 518) has been merged into a new F (538). Finally, each G (490, 500, 510, and 520) has been merged into a new G 532. As is shown in FIGS. 12A and 12B, the clauses that were present at the same level of the tree and that had the same number of incoming or outgoing paths were merged together. Other implementations for determining that the components can be merged can also be used, as discussed herein.

FIGS. 13-18 are logical diagrams for one implementation of the system of FIG. 1 illustrating using the component merging process to modify the exemplary set of components from FIG. 12A one section at a time starting from the end of the components. While this example performs the merging by traversing the nodes from the end, the same process could be alternatively or additionally performed from the beginning. Beginning with FIG. 13, four distinct paths 550 are shown. The first path flows from A (552) to B (554) to D (556) to E (558) to G (560). The second path flows from A (562) to B (564) to D (566) to F (568) to G (570). The third path flows from A (572) to C (574) to D (576) to E (578) to G (580). The final path flows from A (582) to C (584) to D (586) to F (588) to G (590).

Figure 13:
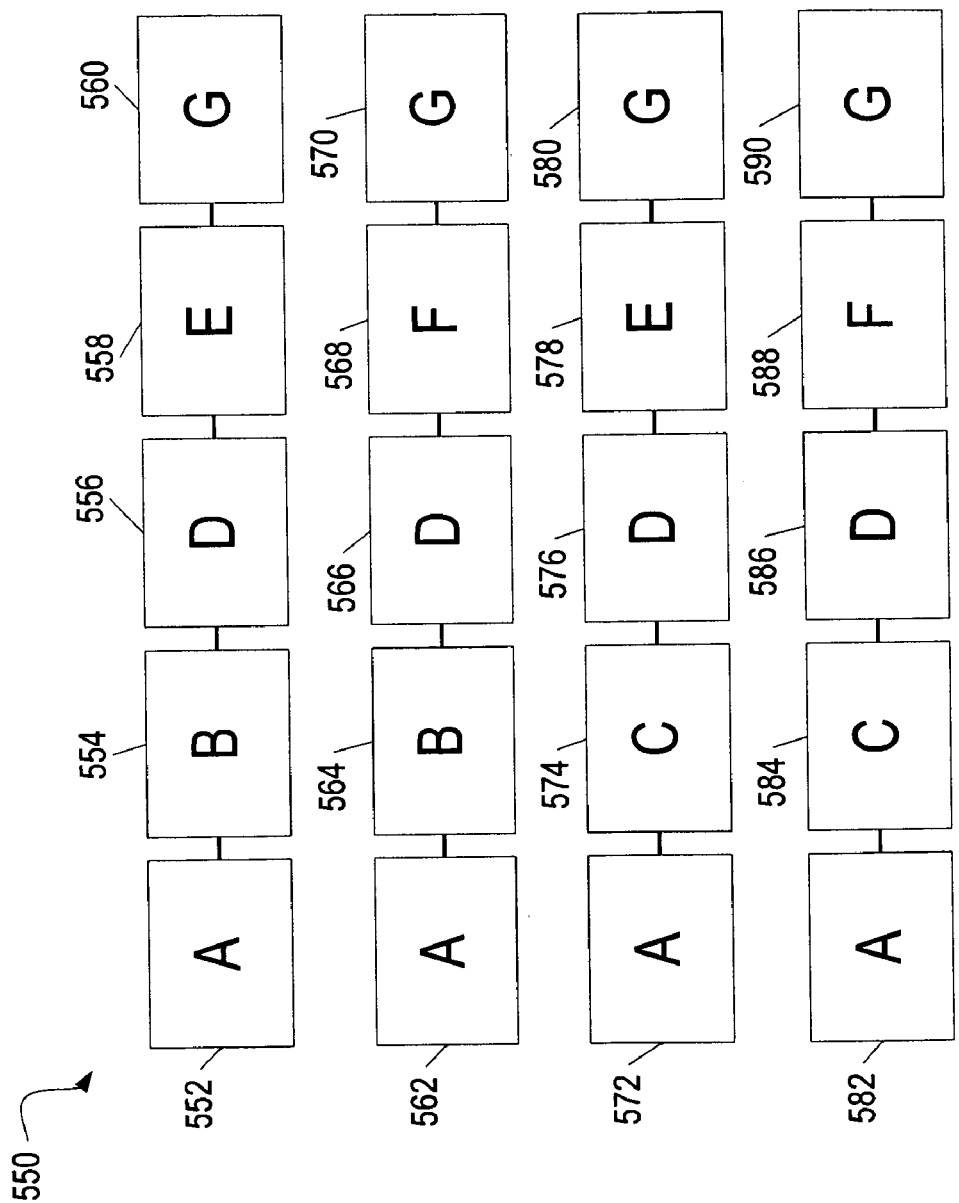
FIGS. 13-18 are logical diagrams for one implementation of the system of FIG. 1 illustrating using the component merging process to modify an exemplary set of components in one section at a time starting from the end of the components.
Figure 14:
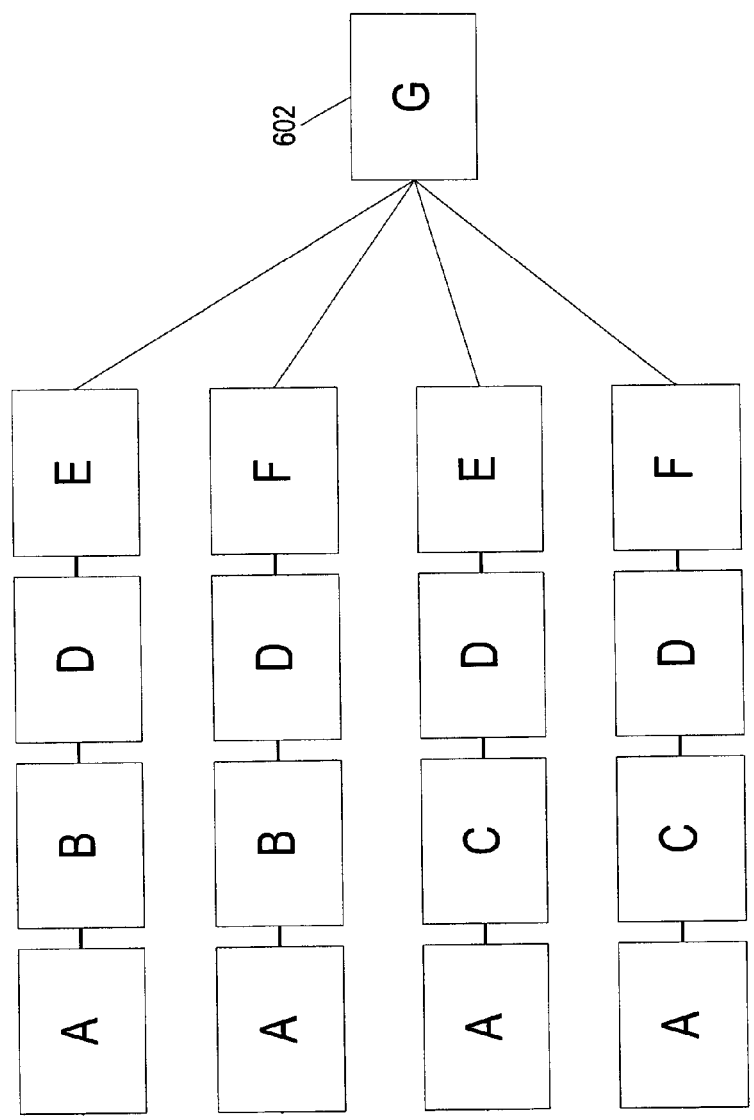
Figure 15:
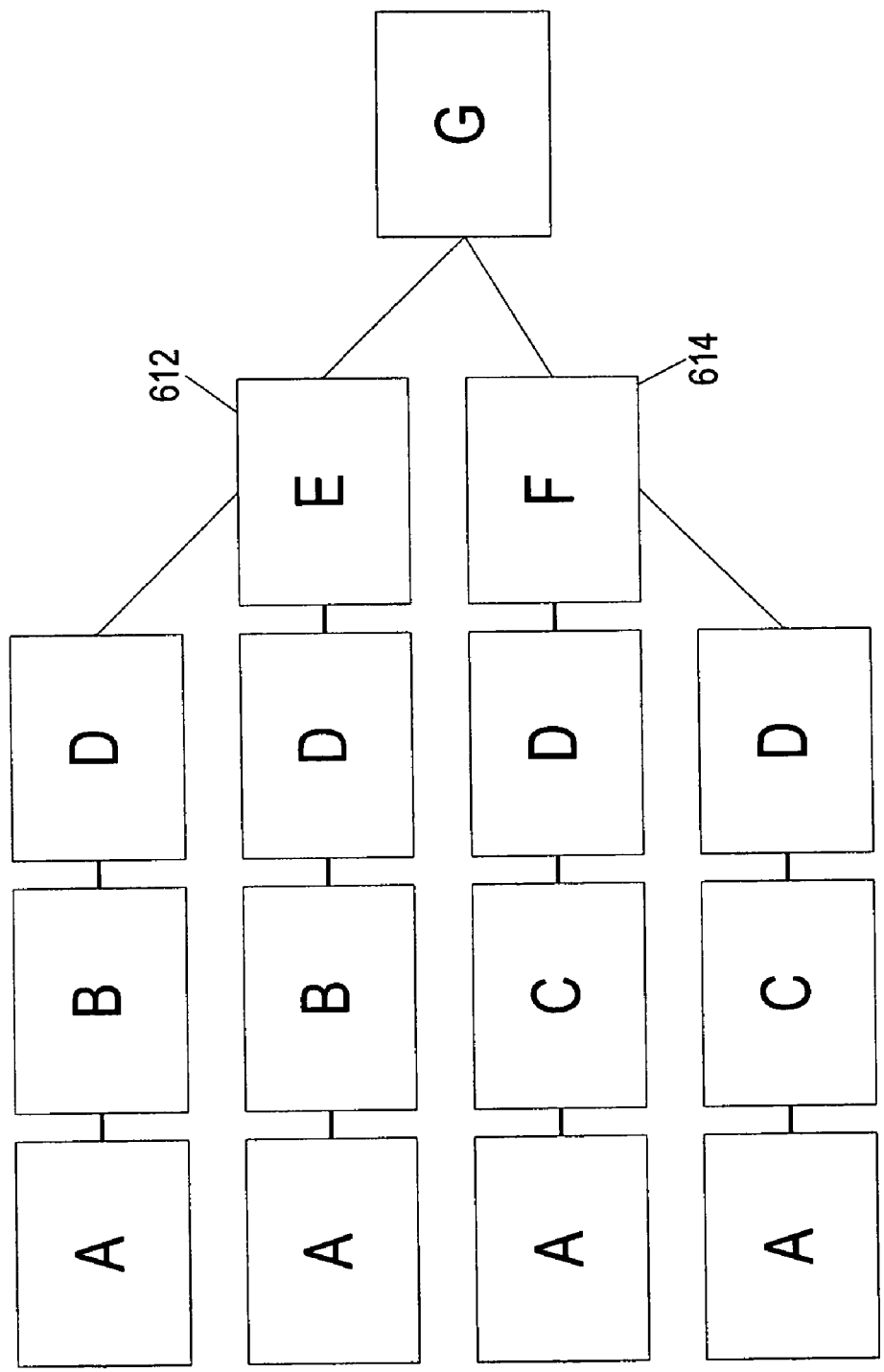

Turning now to FIG. 14 with continued reference to FIG. 13, the system starts with the end of each path and compares each node at the same level, which in this example is each G node (560, 570, 580, and 590). The system determines that the nodes are equivalent and can be merged, so the new merged G 602 is illustrated on the design surface. In one implementation, as the merging process executes, visual indicators are shown on the design surface to illustrate what components were merged. One non-limiting example of a visual indicator includes providing animations showing each G (560, 570, 580, and 590) spinning, disappearing, and then the new G (602) appearing. Now that the first level of nodes has been analyzed (and merged as appropriate), the system traverses back to the next level of nodes in each path, which is 558, 568, 578, and 588. As shown in FIG. 15 with continued reference to FIG. 13, the E nodes (558 and 578) are merged into a new E (612), and the F nodes (568 and 588) are merged into a new F (614).

Figure 16:
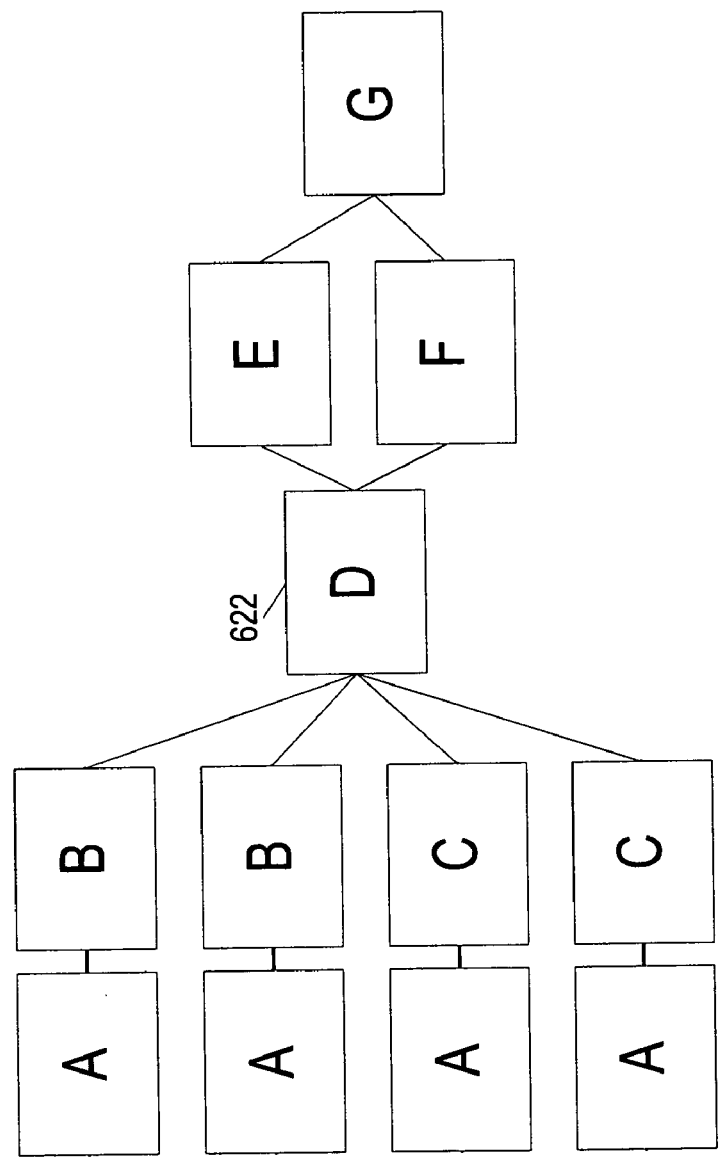
Figure 17:
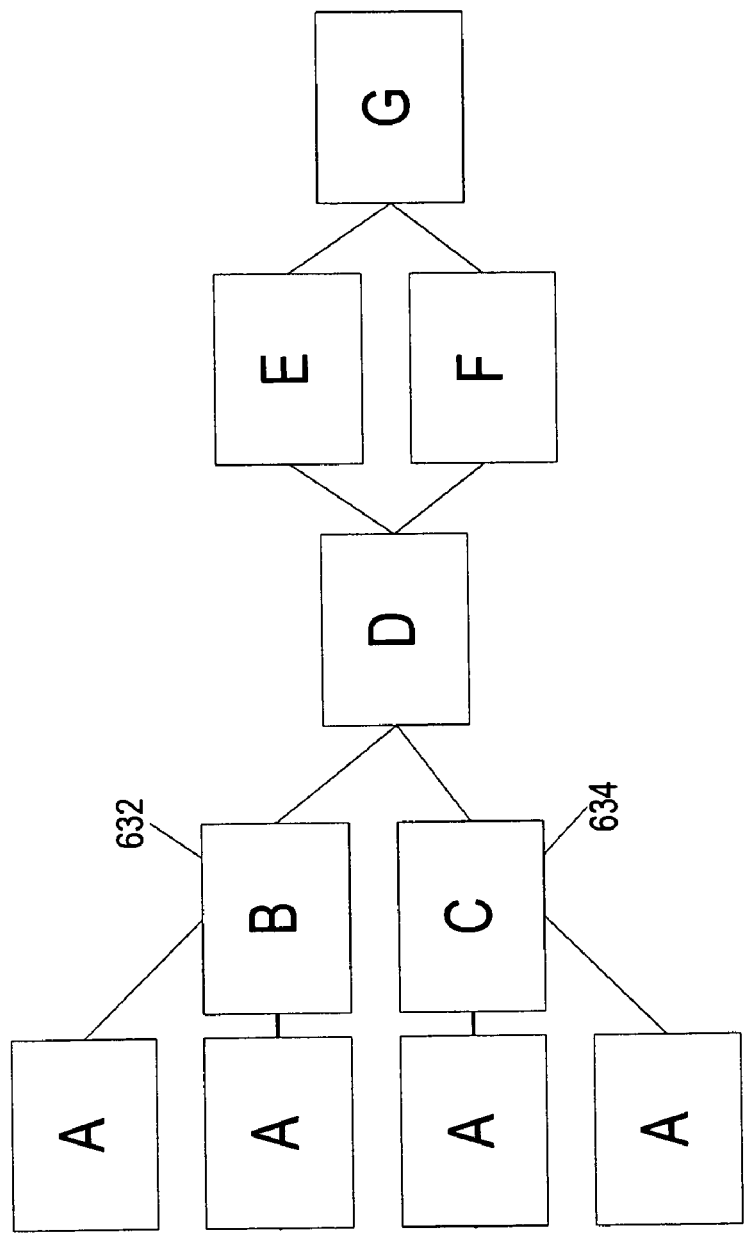
Figure 18:
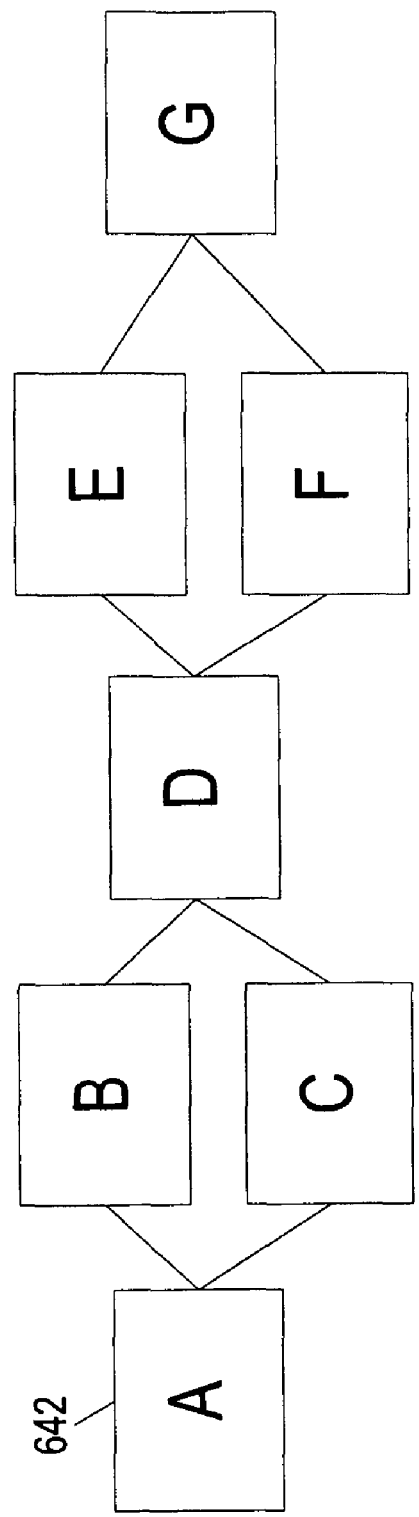

The system now traverses back to the third level of nodes in each path, which is 556, 566, 576, and 586. As shown in FIG. 16 with continued reference to FIG. 13, the D nodes (556, 566, 576, and 586) are all merged into a new D node (622). Similarly, the system traverses back to the fourth level of nodes, which in this example is 554, 564, 574, and 584. As shown in FIG. 17 with continued reference to FIG. 13, the B nodes (554 and 564) are merged into a new B node (632), and the C nodes (574 and 584) are merged into a new C node (634). Finally, the system traverses back to the last level of nodes, which include 552, 562, 572, and 582. Since all four of these nodes are the same (all are A's), they are merged into a new A (642). As mentioned previously, while this example illustrated merging the components from the end of the paths towards the beginning, the components could also be merged from the beginning of the paths towards the end.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for merging components comprising the steps of:
   using a processing unit coupled to a memory, receiving input from a user to add a plurality of components to a design surface;
   using the processing unit, programmatically analyzing the components to determine if at least one set of the components can be merged, analyzing the components comprising:
      calculating a quantity of paths into each component;
      calculating a quantity of paths coming out of each component;
      generating a list of incoming paths into each component;
      generating a list of paths coming out of each component;
      obtaining an actual clause or other value of each component;
      using the calculated quantity of paths into each component, calculated quantity of paths out of each component, generated list of incoming paths into each component, generated list of paths coming out of each component and obtained actual clause of other value of each component, traversing each of a plurality of paths into the components simultaneously to determine if a same component exists on a different path at a same level;
   if the analysis reveals that the at least one set of components can be merged, then merging the at least one set of components to reduce a number of components present on the design surface; and
   providing an undo feature to allow the user to undo the merging of the at least one set of components.

2. The method of claim 1, wherein a visual indicator is provided to indicate the merging of the at least one set of components to the user.

3. The method of claim 1, wherein the visual indicator is an animation.

4. The method of claim 1, wherein the analyzing steps is initiated each time the user adds a new component to the design surface.

5. The method of claim 1, wherein the analyzing step is initiated when the user selects an option to initiate a component merging process against an existing document.

6. The method of claim 1, wherein the components are Boolean expressions.

7. The method of claim 1, wherein the components are of a same type.

8. A method for merging components comprising the steps of:
   using a processing unit coupled to a memory, identify a plurality of components and associated paths;
   provide a component merging feature that analyzes the plurality of components and associated paths according to a set of rules and merges a particular set of the components that meet a same criteria, wherein the particular set of components is determined to meet the same criteria if the particular set of components represents a same type of a component, if the particular set of components are equivalent and the particular set of components have a same incoming number of paths or a same outgoing number of paths, the analysis is based on:
   calculating a quantity of paths into each component;
   calculating a quantity of paths coming out of each component;
   generating a list of incoming paths into each component;
   generating a list of paths coming out of each component;
   when merging the particular set of the components, provide a visual indicator to allow a user to see what changed on a design surface; and
   provide an undo feature to allow the user to undo the merging of the particular set of the components, wherein the particular set of components is determined to meet the same criteria if the particular set of components represents a same Boolean expression.

9. The method of claim 8, wherein the visual indicator provided is an animation.

\* \* \* \* \*